W. E. PERRINE.
VEHICLE CHOCK.
APPLICATION FILED OCT. 3, 1911.
1,079,020. Patented Nov. 18, 1913.
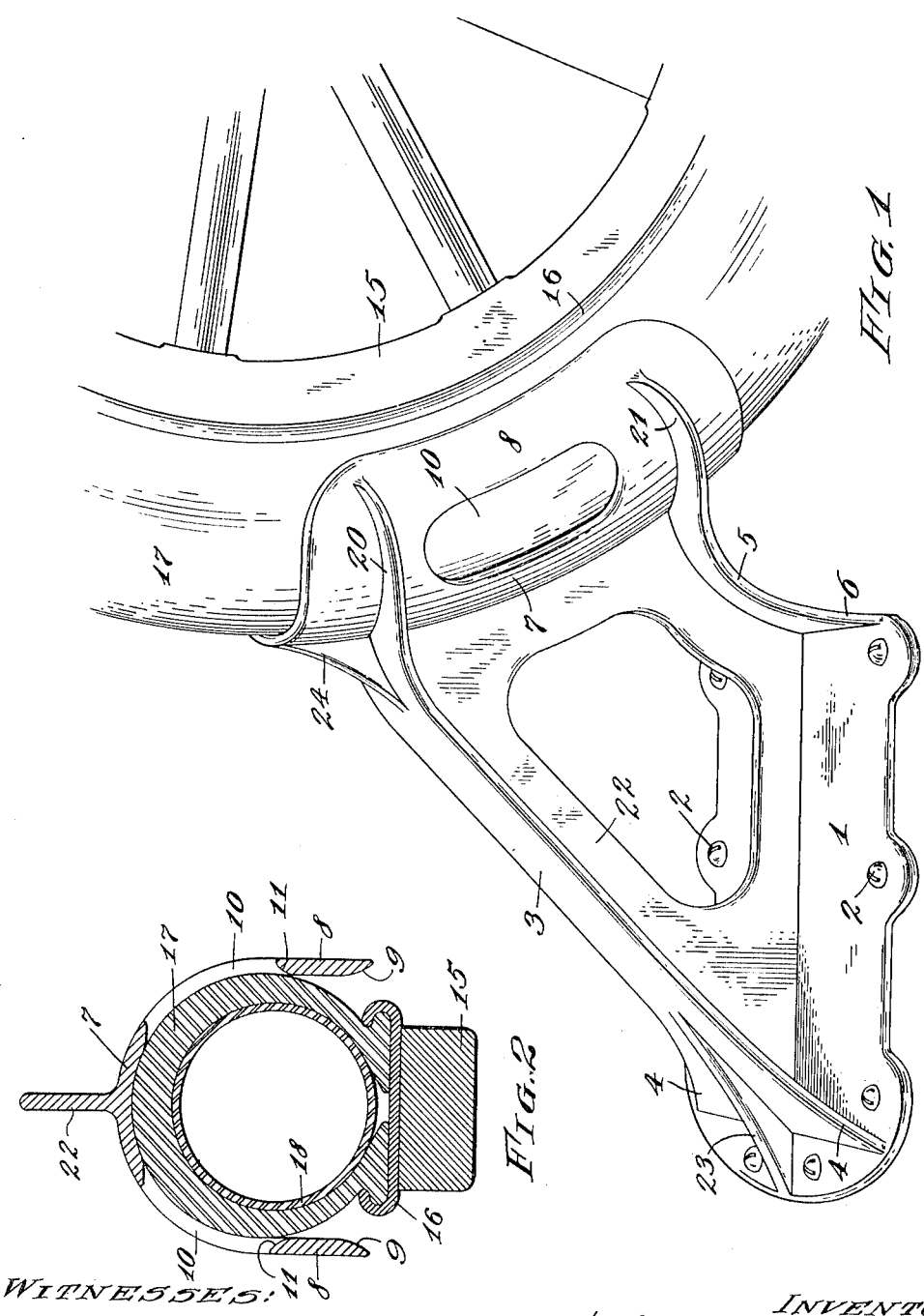
WITNESSES:
Alice B. Moore
Hugh B. McGill
INVENTOR,
William E. Perrine
BY Hull & Smith
ATTYS.

UNITED STATES PATENT OFFICE.

WILLIAM E. PERRINE, OF CLEVELAND, OHIO, ASSIGNOR OF ONE-THIRD TO CHRISTIAN GIRL, OF CLEVELAND, OHIO, AND ONE-THIRD TO ERNEST W. FARR, OF CLEVELAND HEIGHTS, OHIO.

VEHICLE-CHOCK.

1,079,020. Specification of Letters Patent. Patented Nov. 18, 1913.

Continuation of application Serial No. 541,053, filed January 31, 1910. This application filed October 3, 1911. Serial No. 652,607.

*To all whom it may concern:*

Be it known that I, WILLIAM E. PERRINE, a citizen of the United States, residing at Cleveland, in the county of Cuyahoga and State of Ohio, have invented a certain new and useful Improvement in Vehicle-Chocks, of which the following is a full, clear, and exact description, reference being had to the accompanying drawings.
This invention relates to devices, sometimes called chocks, for securing the wheels of vehicles against movement upon the platform or floor upon which they are standing, and specifically to a device for use in the shipment of automobiles, whereby the wheels thereof can be secured firmly to the floor of the car upon which they are carried and this without injuring either the finish of the wheel or the tire carried thereby.
The object of the invention is the provision of a device of this character which shall be as light as is consistent with the necessary strength, which shall be cheap of production and efficient in use, which shall be sightly in appearance so as not to detract from the beauty of the automobile with which it is used, which shall be made in one integral piece, and shall serve to grasp the automobile wheel securely without the use of hinged or other movable parts.

Certain of the features of the present invention were disclosed in my former application filed Jan. 31, 1910 Serial Number 541,053, of which this application is a continuation as to all of the subject matter common to the two, said former application having been abandoned in favor of this application.

Generally speaking, my invention may be defined as consisting of the combinations of elements recited in the claims annexed hereto and illustrated in the drawing accompanying and forming a part hereof, wherein:

Figure 1 is a perspective view of my improved wheel anchorage or chock, showing a portion of an automobile wheel secured thereby, and Fig. 2 a section through the automobile wheel rim and tire and through that portion of the device which coöperates therewith immediately.

Describing the parts by reference characters, 1 indicates the base of the device which is preferably made in the form of a flat plate as shown in Fig. 1 and provided with a plurality of apertures for the reception of screws or bolts 2 whereby it can be secured to the floor of a car or other platform. The part of said base which approaches most nearly to the wheel with which it is used will hereinafter be termed the "front" thereof, and the other end, the "rear", while similar terms will be employed to designate the parts of the complete device as well. Extending forwardly and upwardly from the rear end of said base is a flat brace 3, the lower end of said brace preferably being laterally widened or flared, as at 4—4, in order to afford a greater lateral stability, and the angle between said brace and base being preferably substantially forty five degrees, said brace being substantially straight for the major part of its length. Extending upwardly from the front end of said base is a second shorter brace 5, said second brace being curved forwardly as shown in Fig. 1 so as to become substantially parallel with the brace 3 at its forward end. The lower end of the latter brace is also preferably flared or widened at its forward end as shown at 6. The planes of said braces and of said base are preferably substantially perpendicular to the same vertical plane. Secured between the ends of said braces is an open slanting trough-portion indicated generally at 7. said trough portion being curved in the direction of its length upon a radius substantially equal to the mean radius of wheels with which it is expected to be used. The diameter of said trough is made substantially equal to the external width of the smallest tire with which it is expected to be used, and its depth is preferably greater than the half-depth of the tire as illustrated in Fig. 2. The sides of the trough are shown at 8—8 and are preferably substantially tangential to the sides of the tire and parallel with each other as shown in Fig. 2, but are preferably flared outwardly at their edges as shown at 9—9 in order to facilitate the entrance of the tire thereinto. The sides of the trough are preferably cut away to form longitudinally extended slots or apertures 10, 10, the inner edges of said slots being preferably rounded or chamfered away as shown at 11. As a result of this construction, a tire, particularly if it be slightly larger than the diameter of the trough, will bulge laterally slightly into these slots or apertures, thus partially relieving the pressure upon the tire, and causing the wheel to be held yet more firmly in place.

The felly of an automobile wheel is illustrated at 15, the rim at 16, the outer shoe of the tire at 17 and the inner tube at 18, although it is to be understood that my improved wheel anchorage or chock is not restricted to use with a tire of this or any other particular form, these parts being merely shown for purposes of illustration.

The ends of the trough portion preferably project beyond the braces 3 and 5 at each end, while the upper and forward end of the braces are preferably forked as illustrated at 20 and 21 so as partially to surround the sides of said trough and form stiffening ribs therefor. The upper end of the brace 3 is conveniently bent downwardly so as to intersect the upper end of the trough-portion substantially at right angles. The lower end of the trough-portion is also spaced vertically above the floor and is preferably spaced longitudinally forward of the front end of said base so as to leave a larger space between the chock and the angle where the tire meets the floor. This improves the appearance of the device and retards the accumulation of dirt and rubbish at that point.

It will be seen that the two braces, the base and the trough portion form what is substantially a trapezoid, two of the sides being somewhat curved and the other sides being straight. The interior of this trapezoid is encircled by a central trapezoidal stiffening web 22, said web preferably bisecting each of said braces and said base as shown in Fig. 1 and projecting from the bottom of said trough portion as shown in Fig. 2. Smaller angular webs 23 and 24 are preferably formed in the external angles formed at the lower and upper ends of the brace 3, respectively.

The above described device is preferably made as an integral casting from malleable iron, aluminum, or like fusible metal. The efficient bracing which each part affords for every other part permits all of the members to be made exceedingly thin without reducing the strength to a dangerous degree. This factor is important not only because of the greater cheapness in first cost, but because of the less expense of the returning the same to their starting point after shipment. Furthermore the webs, flanges, braces, base, and trough are preferably made of substantially the same thickness, whereby all the parts may cool after casting at substantially equal rates thereby avoiding warping and cracking.

Having thus described my invention, what I claim and desire to secure by Letters Patent of the United States is:—

1. A chock for vehicle wheels comprising a base adapted to be secured to the floor upon which the wheel rests, upwardly extending ribs or braces extending from opposite end portions of said base, and a curved trough at the upper ends of said ribs or braces adapted to receive a portion of the tire of the wheel.

2. A chock for vehicle wheels comprising a base adapted to be secured to the floor upon which the wheel rests, a curved trough supported from said base, the internal diameter of said trough being not greater than the external width of the tire of said wheel and the depth of the trough being greater than one-half the depth of the tire, the sides of the trough being formed each with a longitudinally extending aperture, each aperture having beveled or chamfered edges.

3. A chock for a vehicle wheel comprising a body having a flattened base and an upwardly inclined flattened brace or rib extending from near each end of the base and a curved trough carried by the upper ends of said ribs or braces, there being a web within and uniting the base, trough, and ribs or braces.

4. A chock for a vehicle wheel comprising a body having a flattened base and an upwardly extending inclined plate or rib near each end of the base, a curved trough carried by the upper ends of the ribs or braces, the upper ends of the ribs or braces being laterally extended to form lateral braces for the end portions of the trough.

In testimony whereof, I hereunto affix my signature in the presence of two witnesses.

WM. E. PERRINE.

Witnesses:
 J. B. HULL,
 BRENNAN B. WEST.